United States Patent [19]

Picou

[11] 4,223,185
[45] Sep. 16, 1980

[54] MULTIFREQUENCY DIGITAL SIGNAL RECEIVER

[75] Inventor: Claude H. Picou, Saint Cloud, France

[73] Assignee: Le Materiel Telephonique, Boulogne-Billancourt, France

[21] Appl. No.: 960,723

[22] Filed: Nov. 14, 1978

[30] Foreign Application Priority Data

Nov. 18, 1977 [FR] France ............... 77 34683

[51] Int. Cl.² ........................................... H04M 1/50
[52] U.S. Cl. ............................ 179/84 VF; 364/726
[58] Field of Search ............ 179/84 VF; 328/138; 324/78 D; 364/484, 726, 728; 343/100 CL

[56] References Cited

U.S. PATENT DOCUMENTS 4,025,730   5/1977   Sawai ............... 179/84 VF

Primary Examiner—James W. Moffitt
Assistant Examiner—Joseph A. Popek
Attorney, Agent, or Firm—Roland Plottel

[57] ABSTRACT

A multifrequency code receiver for signals consisting of the sampled and encoded sum of q sinusoids of amplitudes $A_f$, whose frequencies f are regularly spaced apart by $\Delta F_i = p\Delta F_O$ ($\Delta F_O$ being a divisor of the sampling frequency $F_E$) the receiver possessing a heterodyne device transforming each value f into $F_L - f$, a multiple of $\Delta F_O$, a counter counting up to r, where $r = F_E/F_T$, $F_T$ being the divisor of $F_E$ greater than $(q-1)\Delta F_i$, filtering circuit, a fast Fourier transform (FFT) computer for $N_T = F_T/\Delta F_O$ samples producing the amplitudes $A_f$.

10 Claims, 7 Drawing Figures

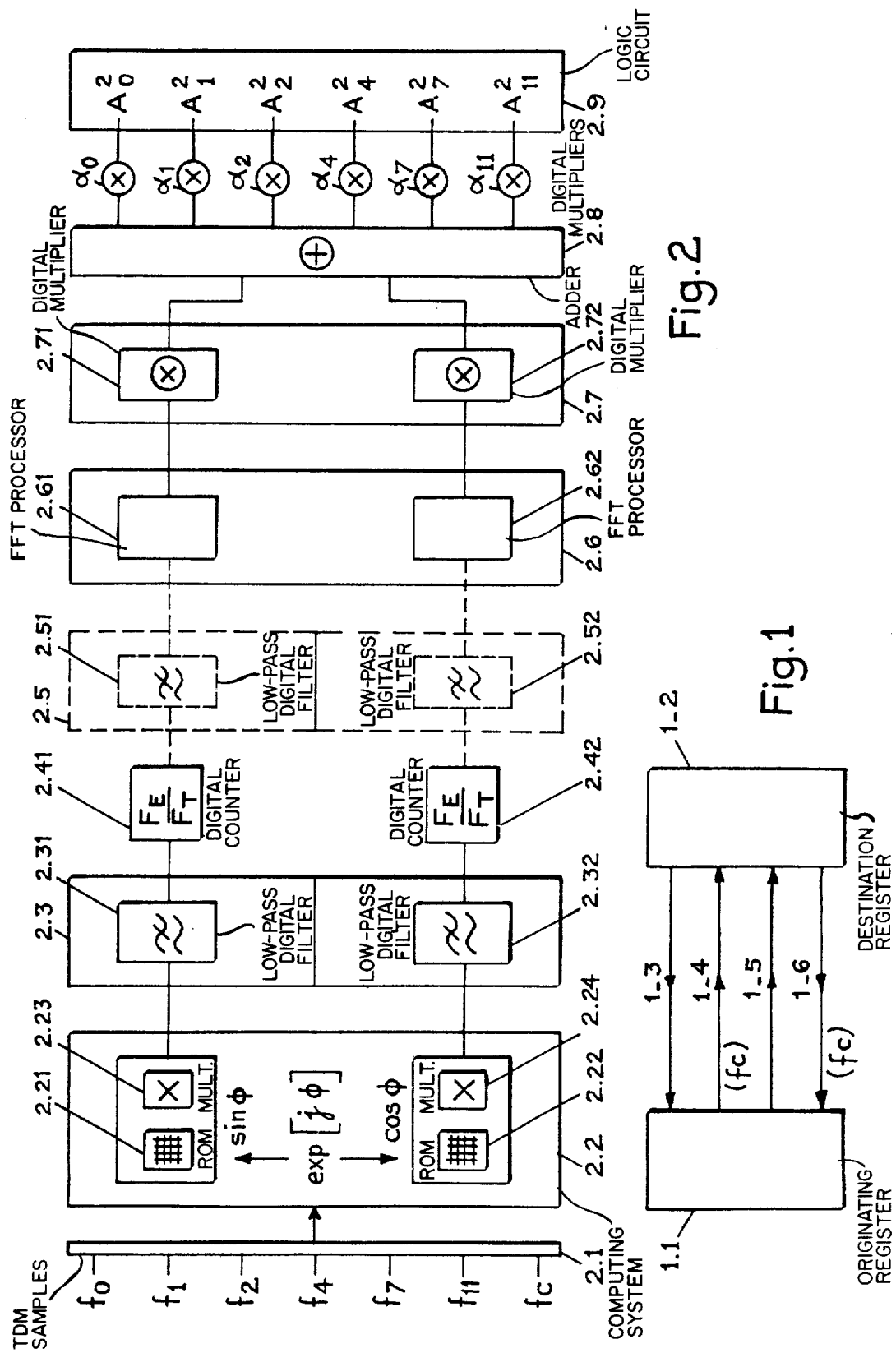

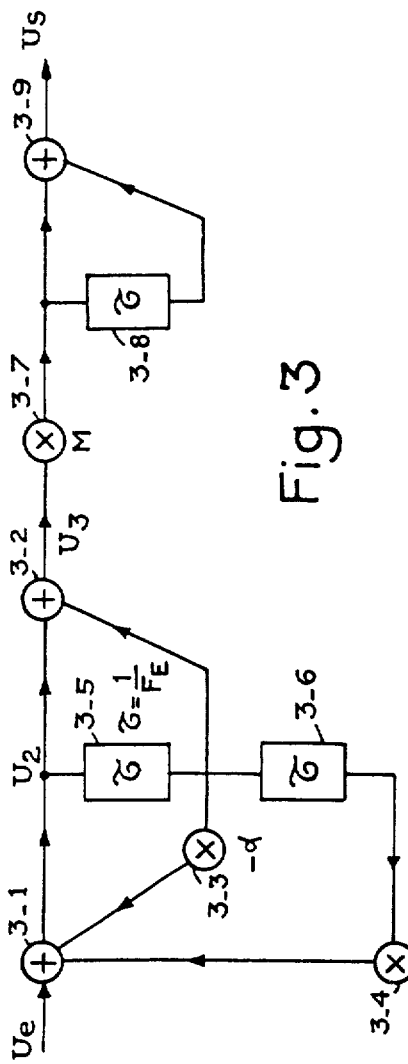
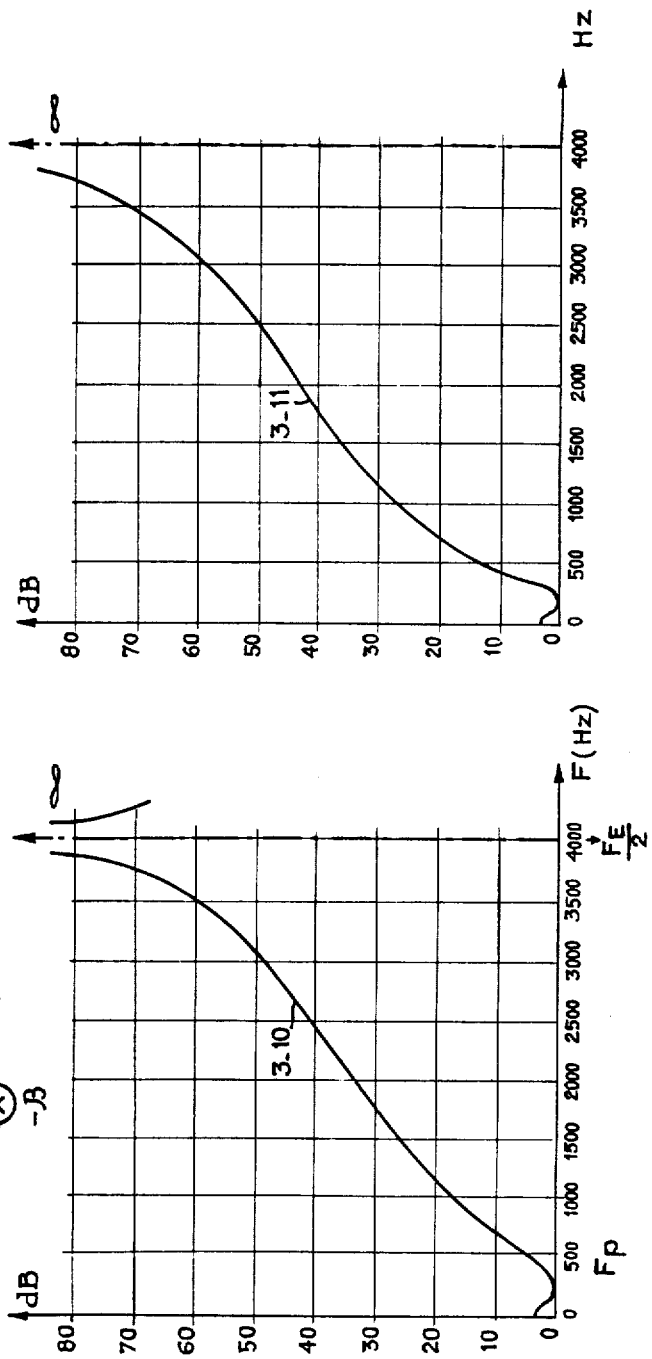
Fig. 3

Fig. 4

MULTIFREQUENCY DIGITAL SIGNAL RECEIVER

BACKGROUND OF THE INVENTION (a) Field of the Invention

The present invention relates to receivers used in multifrequency signalling devices, especially between automatic telephone exchanges. It is more particularly concerned with time-division switching systems of the PCM type in which the speech channel is also used as the signalling channel. (b) Discussion of the Prior Art In these multifrequency devices defined in accordance with C.C.I.T.T. recommendations, each signalling code element possesses two sinusoidal voice-frequency signals selected from q predetermined signals. There are therefore $q[(q-1)/2]$ distinct codes which can represent, for example, $q[(q-1)/2]$ decimal numbers.

Former techniques describe multifrequency signal receivers using filters and frequency-identification circuits of the analogue type. Such circuits are difficult to use because of the effects of component value dispersion, ambient conditions and ageing: they require considerable maintenance.

Since the present case is concerned with time-division switching, it is preferable to use digital techniques, since the bifrequency signals are processed in the same manner as the speech signals.

One feature of the present invention is therefore a multifrequency signal receiver using digital techniques for identifying without ambiguity the signalling frequencies from real signals in the time continuum. As in the case of all digital circuits of this type, such a receiver is relatively insensitive to the effects of interference and moreover its adjustment in the factory and its maintenance are very simple.

The advantages of digital techniques are so great that it has been proposed in certain known systems to sample and linearly encode in binary form multifrequency signals appearing in analogue form upon reception. In particular, a receiver of this type is described in the French Pat. No. 2295665 entitled "Récepteur numérique de signaux multifréquences" (Digital Receiver for Multifrequency Signals) filed on Dec. 18, 1974.

The means used for the present invention include a discrete Fourier transform (DFT) calculation device which converts a series of real-time samples whose amplitudes y(k) are quantified and encoded into a series of real frequency-characterized signals. Such a device therefore behaves in the present case as a group of q filters for recognizing the presence or absence of two frequencies amongst the q signalling frequencies.

It is always possible to perform this transformation with a general-purpose computer. However, and this is precisely the main purpose of the invention, the special structure of certain multifrequency codes can allow considerable simplification of the calculations and the production of special-purpose computers consisting of fewer components.

In order to fix one's ideas, this type of situation occurs for example with the SOCOTEL multifrequency (SOCOTEL MF) system which, in addition to a 1900 Hz control frequency $f_c$, has six frequencies associated in pairs to produce 15 code combinations. These six frequencies lie between 700 and 1700 Hz in arithmetical progression.

Since the largest common divisor of the numbers of this progression is 100, it is possible to receive 7 to 17 complete sinusoidal periods in an interval $T_0=1/\Delta F_O=10$ ms. It may be inferred that taking an average value over a sufficiently long period $vT_0$, determination of the code frequencies results from the calculation of the spectral composition during a succession of v periods.

In general, according to Shannon's theroem, the sampling frequency $F_E$ of the processed analog signal in sampled digital systems should be at least twice the maximum frequency of the transmitted band (i.e. 4 kHz for telephone systems). In a PCM system, $F_E$ is therefore 8000 Hz.

It is immediately seen that in the case of the SOCOTEL MF system, $\Delta F_0$ is a divisor of $F_E$: $F_E/\Delta F_0=80$. The common solution for determining the spectral composition of a received time-division signal by using the DFT consists of performing with a computer all the operations defined by the relationship (1)

$$Y(n) = \frac{1}{N} \sum_{k=0}^{N-1} y(k) \cdot \exp(-\frac{2\pi jkn}{N}) \quad (1)$$

where:

$N = F_E/\Delta F_O$
$n = 0, 1, 2 \ldots (N-1)$
$k = 0, 1, 2 \ldots (N-1)$

In this relationship, Y(n) represents the series of spectral samples, k is the order of a sample of the time-division signal having an amplitude y(k) during the interval $T_0$, and N represents the number of samples to be used during the interval $T_0$ for isolating without ambiguity only those spectrum components corresponding to $T_O$.

According to the Nyquist criterion, similar to Shannon's theorem, this last condition is satisfied when $F_E$ is at least twice the maximum frequency of the time-division signal, i.e. $2f_p$.

In the case of the SOCOTEL MF system, $f_p=1700$ Hz, whence $F_E > 2f_p$ and $N = F_E/\Delta F_O = F_E T_O = 80$.

A special property of the DFT associated with the periodic character ($T_O$) of the time-division signal ($\Delta F_O$) of the spectrum is seen in the following two relationships:

$$y(k) = y(k \pm mN) \quad (2)$$

$$Y(n) = Y(n \pm mN) \quad (3)$$

where $m = 0, 1, 2, \ldots$

In certain cases, these relationships make it possible to simplify the determination of the spectrum components by relationship (1).

In general, the time-division samples can be represented in symbolic form $y_r(k) + jy_i(k)$, and the determination of each of the terms of the second term of relationship (1) requires in principle 4 multiplications and 2 additions in order to calculate $Y(n) = Y_r(n) + jY_i(n)$.

It is seen that the calculation of all the values $Y_i(n)$ and $Y_r(n)$ requires $Q = (4+2)N^2$ operations.

By means of an algorithm proposed by Cooley and known as the fast Fourier transform (FFT), it is possible to reduce Q considerably when N is written: $N = a^\alpha \times b^\beta \times c^\gamma \times \ldots$, where a, b, c, $\ldots$ are the natural prime numbers and $\alpha, \beta, \gamma, \ldots$ are small-value exponents. In this case:

$$Q = (4+2)N(\alpha a + \beta b + \gamma c \ldots).$$

The reduction is considerable when $N=2^\alpha$.

$$Q=(4+2)(2N\log_2 N).$$

For example, if $N=80$, the simple application of formula (1) requires $4\times 6400$ multiplications and $2\times 6400$ additions.

If the FFT algorithm is applied:

$$N=2^4\times 5;\ (\alpha a+\beta b)=13.$$

$4\times 1040$ multiplications and $2\times 1040$ additions are still required for calculating all the $Y_1(n)$ and $Y_2(n)$ terms.

If, however, $N_T$ can be reduced by an artifice to 16, the number of samples which define the digital spectral composition during the interval $T_0=1/\Delta F_0=10$ ms, the determination of the complex Y spectrum only requires: $4\times 128$ multiplications and $2\times 128$ additions at the most.

The properties of the FFT are described in "Théorie et Application de la transformation de Fourier rapide" (Theory and Application of the Rapid Fourier Transform) by J. Lifermann (Masson—Paris 1977) and also in Chapter 7 of "Introduction to Digital Filtering" (John Wiley and Sons—London—New York—1975).

SUMMARY OF THE INVENTION

The present invention is based on these considerations and its practical forms use a special FFT computer is signalling frequency filter.

According to the main aspect of the invention, a digital frequency-changing system having a local frequency $F_L$ and located close to the centre of the signalling frequency band reduces the maximum frequency of the signal and therefore the sampling frequency and the number of samples, which become $F_T$ and $N_T$ respectively, considerably smaller than $F_E$ and $N_E$.

The means proposed by the invention are applicable each time the q code frequencies constitute an arithmetical progression with $\Delta F_i=p\Delta F_O$, $\Delta F_O$ being a common divisor of $F_E$ and $\Delta F_i$.

The main aspect of the invention may be described as follows. If $f_m$ represents the centre frequency of the band of q frequencies, $F_L$ is selected with respect to $f_m$ such that the absolute values of the transposed frequencies $F_L-f$ are multiples of $\Delta F_O$. In this frequency transposition, the spectrum of q frequencies and having a width $p(q-1)\Delta F_O$ is divided into two half-bands of "positive" and "negative" frequencies whose maximum width in absolute value is $f_p$.

If q and p are even numbers, $F_L$ is chosen equal to $f_m$, whence $$f_p = \frac{p(q-1)}{2}\Delta F_0.$$

If q is even and p is odd, $F_L$ is chosen equal $f_m\pm\Delta F_O/2$, whence $$f_p = \frac{p(q-1)+1}{2}\Delta F_0.$$

If q is odd, $F_L$ is chosen equal to $f_m$, whence $$f_p = \frac{p(q-1)}{2}\Delta F_0.$$

In the last of these cases, $f_m$ is equal to the centre frequency of the spectrum and in order to avoid a zero transposed frequency, it is possible to select $F_L=f_m\pm\Delta F_O$, whence $$f_p = \frac{p(q-1)}{2} + 1\ \Delta F_0.$$

According to the Nyquist criterion, the new sampling frequency $F_T$ should be greater than $2f_m$.

$F_T$ is chosen to be a multiple of $\Delta F_O$ and also a divider of $F_E$ and exceeding $2f_m$ (preferably the next higher divider), whence $F_T=F_E/r$.

The number of useful samples for defining the spectrum in the interval $T_O=1/\Delta F_O$ is $N_T=F_T/\Delta F_O$.

In order to understand the invention more clearly, it should be noted that:

$2f_m$ is equal to (q odd; q and p even) or greater than by $\Delta F_O$ (q even; p odd) the spectrum width of the q frequencies;

$\Delta F_O$ is in most cases the largest common divider of $F_E$ and $\Delta F_i$, except that in certain circumstances (q even; p=1), in order to avoid a zero frequency in the transposed spectrum, it is possible to select $\Delta F_{O=\Delta Fi}/2$ provided $\Delta F_i/2$ is also a divider of $F_E$.

It is seen that the major advantage of frequency shifting is to favour the use of the FFT algorithm because of the considerable reduction in the number of samples required.

This can be demonstrated by two examples:

SOCOTEL MF System:
$F_E=2^6\times 5^3$; q=6; $\Delta F_O=100$ Hz; p=2; $F_L=1200$ Hz After frequency shifting, $f_m=500$ Hz and $F_T$ therefore exceeds 1000 Hz. The value selected for $F_T$ is the divisor of $F_E$ immediately greater than 1000, i.e. 1600, whence $N_T=1600/100 = 16$ and $F_E/F_T=r=5$.

$R_2$ System:

This system possesses two different codes for "forward" and "backward" signalling. The six frequencies of each of the codes constitute an arithmetical progression of $\Delta F_i=120$ Hz. The highest common divisor of these six frequencies and of $F_E=8000$ Hz is equal to $\Delta F=20$ Hz.

It is thus seen that the highest common divisor of $\Delta F_i$ and $F_E$ is 40 Hz $=\Delta F_i/3=\Delta F_O$.

$F_L$ is selected such that it is different from one of the centre frequencies of $\Delta F_O$, which is therefore the highest common divisor of $F_E$ and of the six frequencies transposed by frequency shifting.

In the $R_2$ system, the six "forward" signalling frequencies extend from $f_O=1380$ Hz to $f_5=1980$ Hz.

By adopting $F_L=1700$ Hz, the six transposed frequencies become 320, 200, 80, −40, −160 and −280 Hz, multiples of $\Delta F_O$, whence the following values of $T_O$, $F_T$ and $N_T$:

$$T_0 = 1/\Delta F_0 = 25\ ms.$$
$$F_T > 2\times 320\ Hz,\ i.e.: F_T = 800\ Hz = F_E/10$$
$$N_T = \frac{800}{40} = 20 = 2^2\times 5$$

Without the arrangement in accordance with the invention, it would have been necessary to adopt $N=8000/20=400$.

The advantage of the method in accordance with the invention is thus in this case still more apparent than in the case of the SOCOTEL MF system.

It is relevant here to make a remark concerning the appearance of "negative" transposed frequencies produced by the heterodyning. The general relationship (1)

defining the DFT involves only "positive" frequencies $n\Delta F_O$ ($n=0, 1, 2, \ldots N-1$), where $N\Delta F_O = F_E$. Because, however, of the periodic nature ($T_O = 1/\Delta F_O$) of the time-division signal and in accordance with relationship (3), the difficulty is only one of appearance, and is easily removed, since in fact the "negative" frequencies $-n_r\Delta F_O$ obtained by frequency shifting occur instead and in place of $(N-n_r)\Delta F_O$.

In the example of the SOCOTEL MF system, the spectral components of "negative" frequencies $-500$, $-300$ and $-100$ Hz of "negative" orders $-5$, $-3$ and $-1$ are transposed by increasing their order by $N_T = 16$.

In this manner, the six spectrum frequencies between $+500$ and $-500$ Hz are associated with values 5, 3, 1, 15, 13 and 11 of n respectively.

Until now, the formal characteristic of the frequency shifting device has been stated without defining its nature, which relates to the character of periodic pulses whose amplitudes are quantified by the time-division signals processed. The frequency shifting device has been considered as a symbolic multiplier of time-division signals by the cissoid $\exp(j2\pi F_L t)$, enabling the appearance of frequencies $F_L - f$, f representing the multifrequence code frequencies.

In order to produce an operating frequency shifting device in practice, it is necessary to define two other characteristics of the invention which result from the following considerations.

The phase $2\pi F_L t$ should be defined by a sampling at frequency $F_E$. It is therefore necessary to quantify the time t in the form $k/F_E$ and write $\phi = 2\pi k \cdot F_L/F_E$, k being a whole-number series.

In practice, $F_L/F_E$ can be reduced to the irreducible fraction g/h, whence $\phi = 2\pi kg/h$. The cissoid $\exp(j2\pi gk/h)$ periodically assumes the same real and imaginary (cos and sin) values as k varies between 0 and $h=1$, h and $2h-1 \ldots (s-1)h$ and $sh-1$.

Considering the example of the SOCOTEL MF system: $F_L = 1200$ Hz; $F_E = 8000$ Hz; $h = 20$ and $g = 3$.

All the useful values of $\phi$ are obtained by forming the series:

$$3\pi/10 \times 0, 3\pi/10 \times 1 \ldots 3\pi/10 \times 18, 3\pi/10 \times 19.$$

Since the SOCOTEL MF system is defined in an interval $T_O = 10$ ms corresponding to $N = 80$ samples ($s = 4$), the above series is used four times during each period $T_O$.

Although the symbolic multiplication by $\exp(j\phi)$ is convenient for the description, it is necessary to calculate separately the h values of $\cos \phi$ and the h values of $\sin \phi$ for application of the invention. Since these are fixed values as soon as $F_E$ and $F_L$ have been chosen, these values are, in accordance with another characteristic of the invention, written into two tables provided in the form of permanent memory stacks or read-only memories, each of the h rows corresponding to a value or address of angle $\phi$, and the intersections of each row with the l columns corresponding to the data bits defining the value of $\sin \phi$ (or $\cos \phi$) expressed as a binary value.

l should be equal to or less than the number of levels measuring the quantified amplitudes of the time-division samples of the input signal.

In accordance with known techniques, the trains of time-division samples pass at the frequency $F_E$ in front of the address rows. For each address, a multiplying circuit determines the product of the digital value y(k) of the sample for the digital value $\sin \phi$ (or $\cos \phi$).

Returning to analogue notations in order to simplify the description, it should again be noted that the two groups of circuits multiplying by $\sin \phi$ and $\cos \phi$ produce the following products on their outputs for each component of the code $A_f \sin 2\pi ft$:

$$P_C = A_f \sin 2\pi ft \cos 2\pi F_L t$$

and $$P_S = A_f \sin 2\pi ft \sin 2\pi F_L t$$

where f is one of the signalling frequencies.

The following may be written from known trigonometrical relationships :

$$P_C = \tfrac{1}{2}\sin 2\pi(F_L - f)t + \sin 2\pi(F_L + f)t$$

$$P_S = \tfrac{1}{2}\cos 2\pi(F_L - f)t - \cos 2\pi(F_L + f)t$$

The "sum" frequencies due to frequency shifting thus appear on the outputs of each of the groups of multiplying circuits.

Referring again to the example of the SOCOTEL MF system, these "sum" frequencies are 1900, 2100, 2300, 2500 and 2900 Hz. Before determining the presence of the two signalling frequencies by means of the FFT algorithm computer, it is therefore necessary to eliminate these "sum" components and also to eliminate undesirable frequencies corresponding in particular to harmonics of one or the other of the received signalling frequencies, the maximum harmonic levels being defined by the system specifications.

According to another aspect of the invention, this is achieved by placing between the frequency shifting device and the FFT computer two low-pass digital filters of the recursive type operating with a sampling frequency of $F_E$, the two filters being identical and placed on the outputs of the multipliers which produce $A_f \sin 2\pi ft \cos 2\pi F_L t$ and $A_f \sin 2\pi ft \sin 2\pi F_L t$.

The response of these filters is such that the maximum frequency $f_p$ of pass band of maximum attenuation $A_{max}$ is equal to the highest frequency of the spectrum transposed by frequency shifting and that the minimum frequency $f_s$ of the attenuated band of minimum attenuation $A_{min}$ is equal to the lowest frequency of the "sum" spectrum due to frequency shifting.

In the case considered of the SOCOTEL MF system, $f_p = 500$ Hz and $f_s = 1900$ Hz.

In order to economize components and simplify manufacture, it is preferable to select a filter possessing Tchebycheff type I characteristics, whose attenuation oscillates between 0 and $A_{max}$ in the pass-band and increases monotonically from $A_{min}$ to infinity between $f_s$ and $F_E/2$ ($-A_{max}$ and $A_{min}$ being governed by the system specification).

According to another aspect of the invention, it is possible to place two auxiliary filters operating at the transposed sampling frequency $F_T$ (or $2F_T$ if $2F_T$ is a divider of $F_E$) after the recursive filters in order to eliminate certain undesirable insufficiently attenuated spectral components.

A better understanding of the invention and other characteristics, purposes and advantages emerge from the following description firstly concerning a SOCOTEL MF system receiver and secondly an $R_2$ system receiver. This description is illustrated by the appended drawings in which :

DESCRIPTION OF THE DRAWINGS

FIG. 1 is a diagram illustrating multifrequency signalling exchanges between automatic telephone exchanges;

FIG. 2 is a block diagram of a receiver in accordance with the invention;

FIG. 3 is the diagram of a recursive low-pass digital filter, with two frequency-response curves;

FIG. 4 is an organization diagram for an FFT computer with N=16;

DETAILED DESCRIPTION OF THE INVENTION

Application of the SOCOTEL MF System

Figure 5:
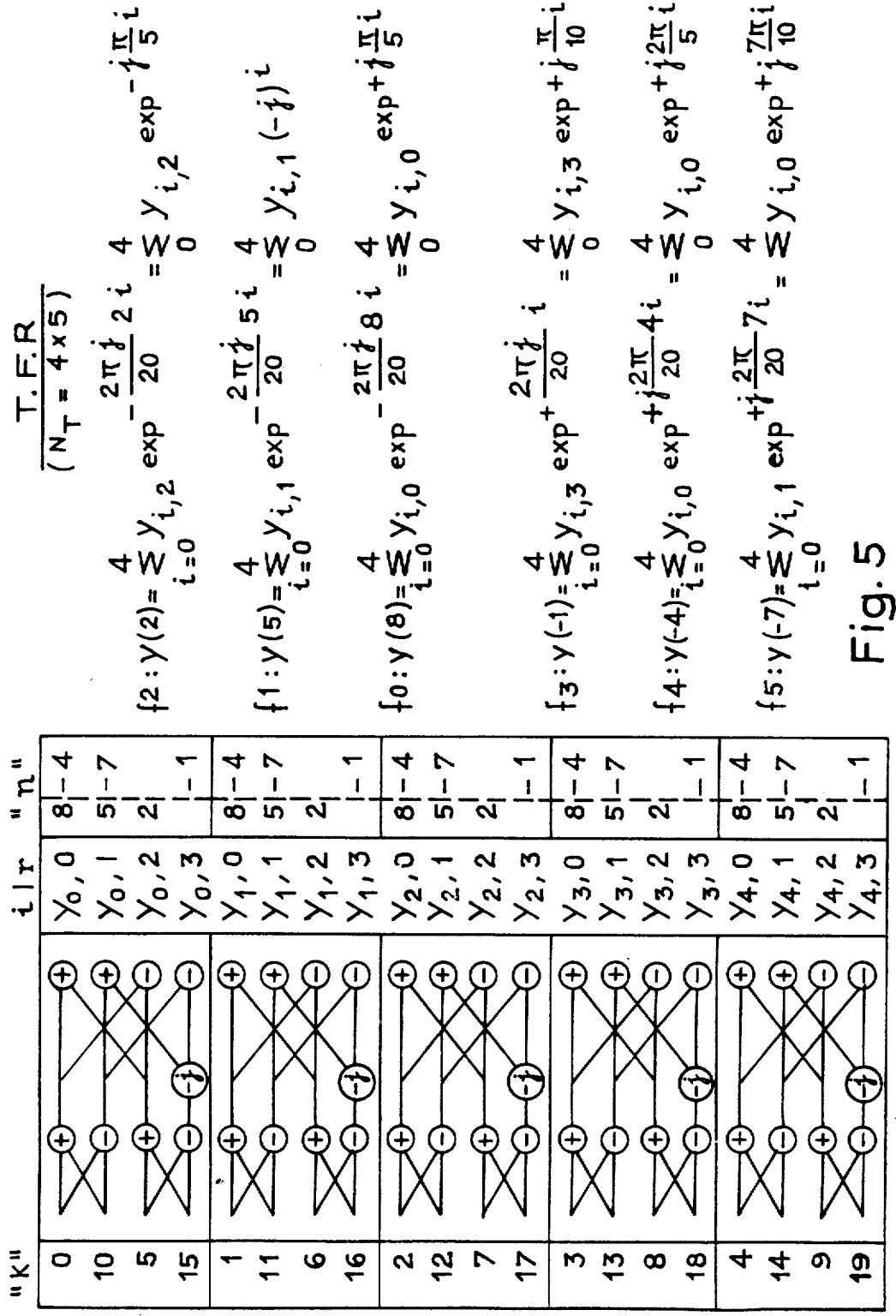
FIG. 5 is an organizational diagram for an FFT computer with N=20.

This system is used for exchanging signalling between automatic telephone exchanges interconnected by 2-wire or 4-wire circuits. In the present case, it is concerned only with so-called register signals which control transmission of the data specific to switching functions, as well as with the natures and states of subscriber lines. It is of the "controlled caller" type.

When the system is used for international traffic, the code consists of two frequencies out of six : $f_O = 700$ Hz, $f_1 = 900$ Hz, $f_2 = 1100$ Hz, $f_4 = 1300$ Hz, $f_7 = 1500$ Hz and $f_{11} = 1700$ Hz.

In addition, the system possesses a control frequency $f_c = 1900$ Hz for control purposes.

The diagram of FIG. 1 illustrates the principle of exchanges over four wires between two units (e.g. registers), one originating 1-1 and the other solicited 1-2, each possessing a frequency sender and a receiver. If 1-2 transmits a signal back to 1-1 as represented by arrow 1-3, unit 1-1, after having recognized this signal, feeds forward as represented by arrow 1-4 the control frequency $f_c$ which, recognized by 1-2, ensures that the backward signal as represented by arrow 1-3 has been received by 1-1 and interrupts the transmission. Having recognized this action, 1-1 in turn interrupts transmission of frequency $f_c$.

If 1-1 sends a signal forwards as represented by arrow 1-5, unit 1-2, provided it recognizes this signal, feeds back frequency $f_c$ as represented by arrow 1-6 and the exchange procedure is the same as that described above.

Units 1-1 and 1-2 thus use the same signal codes, frequency control being provided by $f_c$ only, since the circuits are arranged such that the reception of $f_c$ by one of the units is in no case followed by sending of the same frequency by the other.

According to the system specification, the transmit level of each frequency should be less than an absolute level of $-0.8$ Nepers ($-7$ dBm), and the total harmonic distortion for each frequency must not exceed 10%, the 1st harmonic not exceeding 5%.

These limits are important with regard to reception, for which the level of any interference must be less than a certain value.

The tolerances for each code frequency and $f_c$ is $\pm 6$ Hz.

The absolute levels of the six code frequencies at the receive end should lie between $-0.5$ Nepers ($-4$ dBm) and $-3.9$ Nepers ($-34$ dBm). The difference in level between any two code frequencies must not exceed 0.8 Nepers, i.e. the ratio of these levels must not exceed 7 dB.

In order to minimize the effect of interference, especially that of the harmonic content of the signal sent, or undesirable signals produced by the receive device, receiver operation should be interrupted beneath a threshold level of $-5$ Nepers ($-44$ dBm), i.e. 40 dB below the maximum level of $-4$ dBm.

With regard to frequency $f_c$, its level should lie between $-0.5$ Nepers ($-4$ dBm) and $-3.8$ Nepers ($-33$ dBm), with a cut-off threshold level of $-4.8$ Nepers ($-42$ dBm), i.e. 38 dB below the maximum level of $-4$ dBm.

Another condition must be satisfied at the receive end: the receiver must operate normally for received frequencies within $\pm 20$ Hz of their nominal values.

The organization of the receiver in accordance with the invention and applied to the SOCOTEL MF system is illustrated by the diagram in FIG. 2. This diagram has the same notations as those adopted for the example illustrating the description of characteristics.

The time-division signal sampled at a rate of $F_E$ per second (8000 Hz) and carrying the digitally encoded amplitude data appears on 2-1. These samples contain either noise or useful signalling data consisting of two sinusoidal signals of different frequencies out of the q (six) frequencies $f_O$ to $f_{11}$, accompanied by their harmonics or again, anticipating on the change from 4-wire to 2-wire operation, the 1900 Hz control frequency $f_c$.

The line signals to be processed are first expanded and are then fed to a computing system 2-2 which performs the frequency shifting operation by symbolically multiplying these signals by the cissoid $\exp(j2\pi k.F_L/F_E) = \exp(j\phi)$, where $F_L$ is the local frequency. Since in practice it is necessary to possess simultaneously $\sin \phi$ and $\cos \phi$ as sampled digital values, 2-2 possesses two read-only memories 2-21 and 2-22 having h (twenty) phase addresses from 0 to $(2\pi g/h)$ (h-1), i.e. in the present case from 0 to $(2 \pi \times 3)/20 \times 19$. The values of $\sin 2\pi g/h \times d$ (where d lies between 0 and 19) are written digitally into each address with the required accuracy, as are the twenty values of $\cos 2\pi g/h \times d$.

The digital signals sampled at the frequency $F_E$ circulate in front of the addresses in s sequences (s=4), each possessing h (twenty) successive samples. During the interval $T_O = 1/\Delta F_O = 10$ ms, sh (eighty) samples pass in sequence, completely defining the input signal. By known means represented by the symbol X in 2-23 and 2-24, the digital value of each incoming sample is multiplied by the value of $\sin \phi$ and $\cos \phi$, corresponding to its order n° k. Means 2-23 and 2-24 are required to perform 2N = 160 multiplications in 10 ms.

Figure 6:
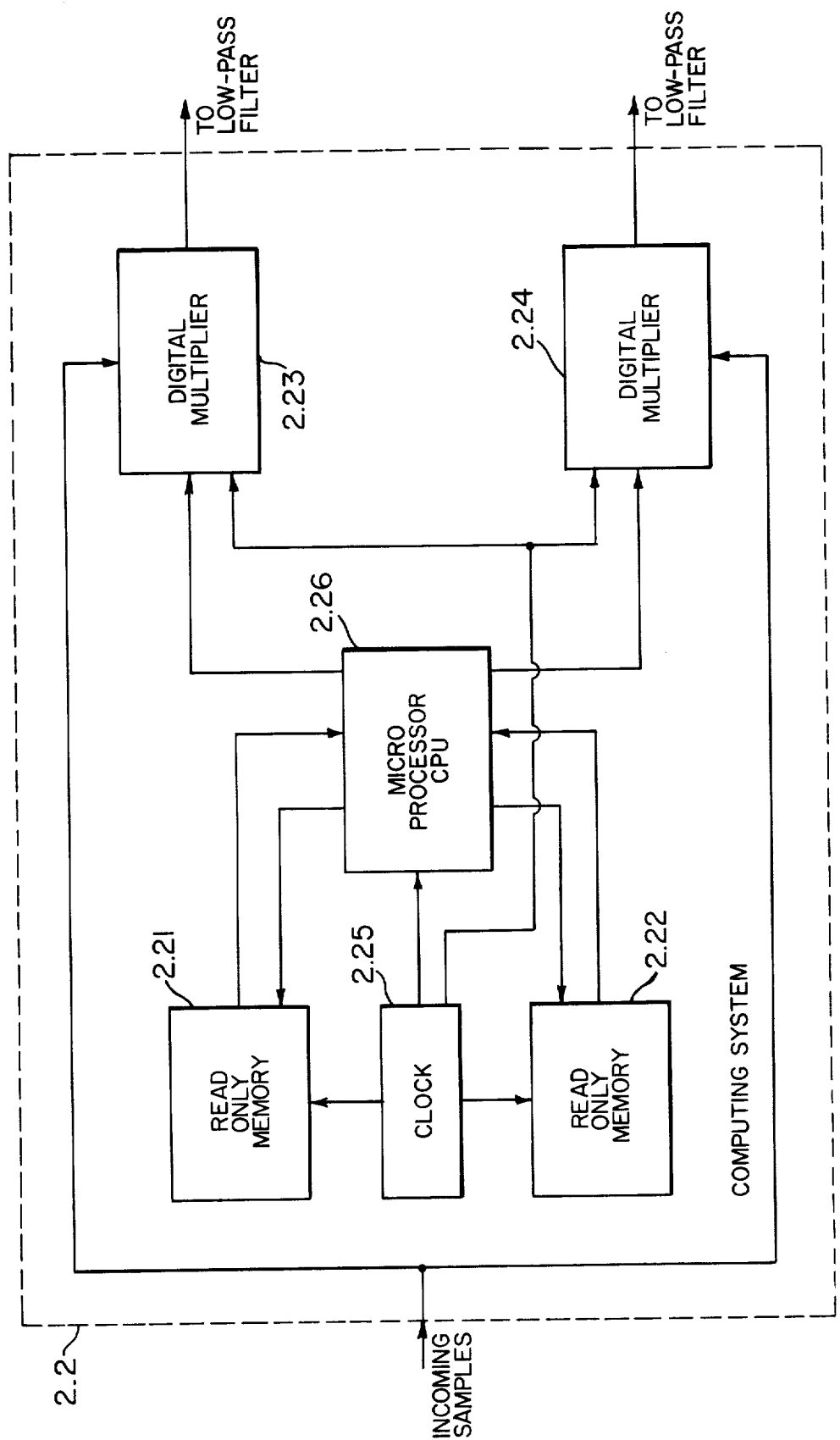
FIG. 6 is a block schematic diagram of the computing system 2.2 shownn in FIG. 1.

FIG. 6 depicts the circuitry of one practical embodiment of computing system 2.2 As shown, a clock circuit 2.25 is connected to a suitable microprocessor 2.26, for example on INTEL 8080, and to digital multipliers 2.23 and 2.24. Microprocessor 2.26 strokes the ROM memories 2.21 and 2.22 and forwards the stored data therein to multipliers 2.23 and 2.24, respectively, for multiplication with the incoming samples from circuit 2.21. This arrangement per se, is entirely conventional and no claim for novelty is made therefor. See, for example, *Introduction to Microprocessor and Microcomputer System* by G. V. Ruo, Van Nostrand Reinhold Company, New York, 1978, Page 2-5, especially FIGS. 1—1 and 1-2 and also *Minicomputers in Instrumentation and Con-*

Figure 4:
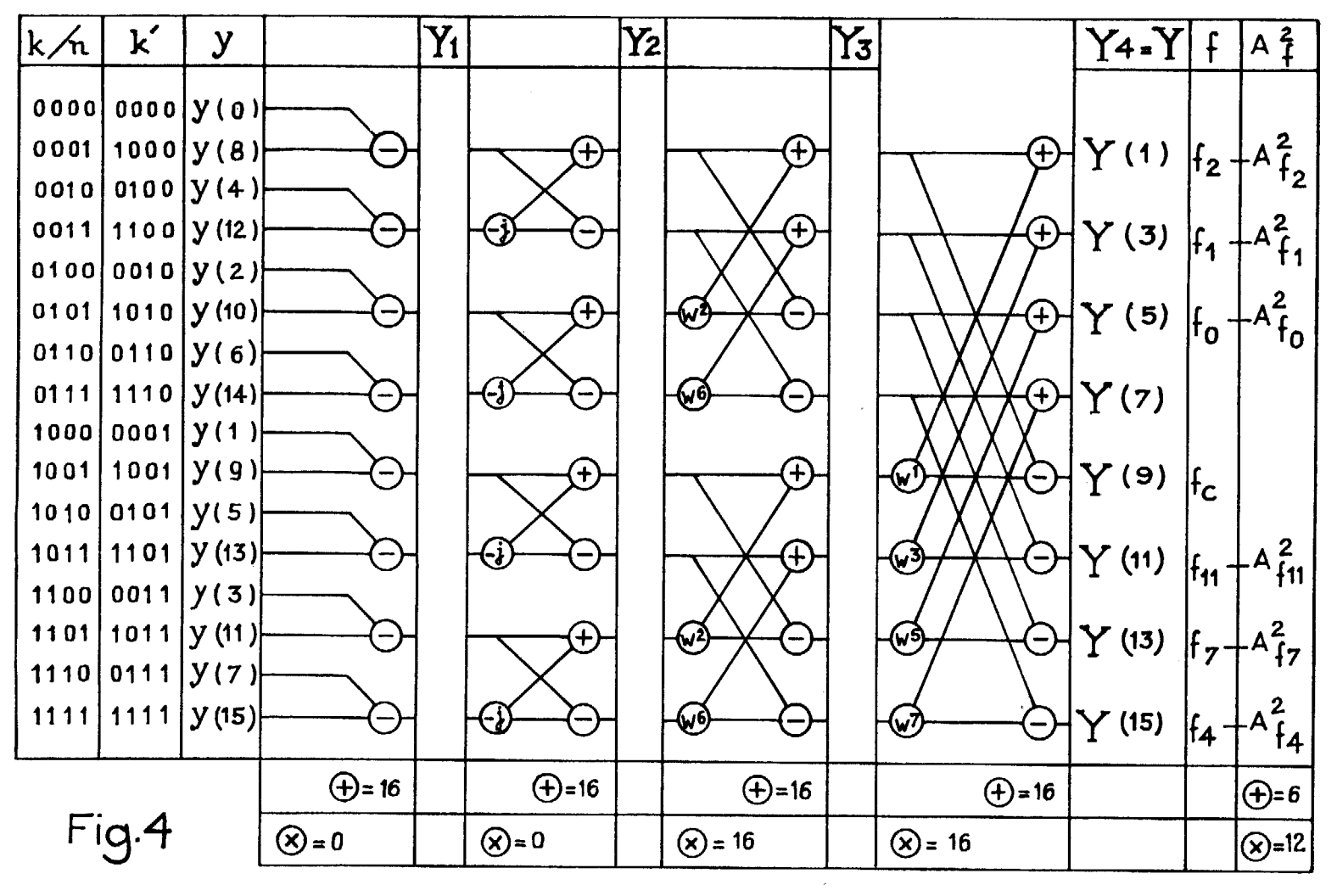

*trol*, "The Hardware of Minicomputers" by D. Turtle, Miniconsult Ltd. London, 1973, pp. 41–46 especially FIGS. 2-5.

It is necessary to eliminate the heterodyne "sum" components on the output of the computing system 2-2 by means of assembly 2-3 possessing two similar low-pass digital filters 2-31 and 2-32, whose outputs produce at the frequency $F_E=8000$ Hz the following:

$$\Sigma \sin 2\pi \frac{F_L - f}{F_E} + \text{residual interference and}$$

$$\Sigma \cos 2\pi \frac{F_L - f}{F_E} + \text{residual interference}$$

where f is either of the two digital signal frequencies appearing on 2-1.

In the present case, 2-31 and 2-32 are recursive low-pass digital filters having the characteristics of 2nd-order type I Tchebycheff filters, whose attenuation oscillates between 0 and 3 dB over the pass-band (0 to 500 Hz) and increases monotonically over the attenuated band from 32 dB at $f_0 + F_L = 1900$ Hz to 50 dB at $f_c + F_l = 3100$ Hz.

The structure of 2-31 and 2-32 is detailed below (FIG. 3).

Five-bit counters 2-41 and 2-42 on the outputs of 2-31 and 2-32 select only one sample out of 5, such that the digital signal is completely determined without ambiguity for an interval $T_O = 1/\Delta F_O = 10$ ms with only $N_T = N/5 = 16$ samples, i.e. a reduced sampling frequency of $F_T = N_T \Delta F_O = 1600$ Hz.

In certain cases, in order to eliminate insufficiently attenuated interference, especially over the transition band (between 500 Hz and 1900 Hz), it may be necessary to follow 2-41 and 2-42 by two auxiliary filters 2-51 and 2-52, of the same nature as 2-31 and 2-32, but operating at the sampling frequency of $F_T = 1600$ Hz.

Depending on the case, the outputs of 2-41 and 2-42 or the outputs of 2-51 and 2-52 are applied to $N_T$ input pairs of an assembly 2-6, which processes the FFT algorithm in two associated calculations symbolized by 2-61 and 2-62. Following each calculation, q outputs of known orders carry the digital values $A_f \sin \phi_f$ for 2-61 and $A_f \cos \phi_f$ for 2-62.

Multipliers 2-71 and 2-72 in 2-7 produce the products $A_f^2 \sin^2 \phi_f$ and $A_f^2 \cos^2 \phi_f$ respectively, which are added for the corresponding orders in q adders 2-8 producing the required digital values $A_f^2$. On the output of 2-8, six circuits multiplying by $\alpha_0, \alpha_1 \ldots \alpha_{11}$ correct the effects of filters 2-31 and 2-32 over the pass-band. In the case considered, $\alpha_0 = \alpha_2 = \alpha_4 = \alpha_{11} = 2$ correspond to frequencies $f_0, f_2, f_4$ and $f_{11}$. $\alpha_1$ and $\alpha_7$ need not be considered since the attenuation is zero for $f_1$ and $f_7$.

In the case of reception of a code consisting of two frequencies out of six, this code is determined by the respective order numbers of the two frequencies.

A logic circuit 2-9 validates the pairs of signals on the output of 2-8 and ensures that their absolute or relative levels are within the limits already defined by the system specification.

The operations performed by the system in FIG. 2 and the results obtained after allowing for the frequency-response of the filters illustrated by FIG. 3 and which are examined below are summarized in three columns of table A.

The first column on the left represents the sinusoidal signals of frequencies $f_0$ to $f_{11}$ and of frequency $f_c$, symbolically multiplied by the cissoid $\exp(j2\pi k \cdot F_L/F_E)$, where $F_L = 1200$ Hz, and sampled at the frequency $F_E$. The second column lists the relative levels of the signals transposed to frequencies $F_L - f$ and $F_L + f$ on the outputs of filters 2-31 and 2-32.

The 3rd column indicates the values of n (i.e. the order numbers of the outputs of 2-8), which characterize amongst the $N_T$ frequencies each of the frequencies $(F_L - f)$ (therefore F) and the values of n of the "sum" components $(F_L + f)$ which can disturb operation of the code recognition device, these latter values of n resulting from relationship $(3): Y(n) = Y(n \pm mN_T)$.

It is seen from this table that the only signals of frequency $F_L + f$ exceeding the maximum level of $-38$ dBm defined by the specification are the first three. Frequency 2300 Hz ($= 1200 + 1100$), however, corresponds to order $n = 7$ which is not one of the "useful" orders. With regard to the 1900 Hz and 2100 Hz "interference" signals of orders 3 and 5 respectively, they appear at the same time as corresponding 500 Hz and 300 Hz "useful" signals of orders 5 and 3 respectively, but their levels are such that they cause no notable disturbance, especially as they are not validated by the logic circuit 2-9.

Part b of table A shows in three columns the levels and orders n of the 2nd harmonics of frequencies $f_0$ to $f_{11}$ and $f_c$ following all the transformations of the input signal.

The orders of the transformed harmonics are still given by relationship $(3): Y(n) = Y(n \pm mN_T)$.

The levels of all the "sum" components $(F_L = 2f)$ are less than $-42$ dBm and therefore need not be considered as interference. It may be noted in passing that frequency $F_L = 2f$ is considered if $F_L + 2f < F_E$, or $F_L + 2f - F_E$ if this is not the case. This is a consequence of the properties of recursive digital filters.

It is seen that the orders n of the transposed 2nd harmonics are even numbers, while the "useful" orders n (see part a) are odd numbers. In principle, the 2nd harmonics of the input frequencies therefore cause no distrubance.

TABLE A

| | a | | | | b | | | | c | | |
|---|---|---|---|---|---|---|---|---|---|---|---|
| | Filtering | | FFT $N_T = 16$ $F_T =$ | | Filtering | | FFT $N_T = 16$ $F_T =$ | | Filtering | | FFT $N_T = 16$ $F_T =$ |
| f (Hz) | $F_L - f$ (Hz) | dB | 1600 Hz n | 2nd Harmonic 2f (Hz) | $F_L - 2f$ (Hz) | dB | 1600 Hz n | 3rd Harmonic 3f (Hz) | $F_L - 3f$ (Hz) | dB | 1600 Hz n |
| $f_0 = 700$ | 500 | $-3$ | 5 | $f_0 = 700\ 1400$ | $-200$ | 0 | 14 | $f_0 = 700\ 2100$ | $-900$ | $-15$ | 7 |
| $f_1 = 900$ | 300 | 0 | 3 | $f_1 = 900\ 1800$ | $-600$ | $-7$ | 10 | $f_1 = 900\ 2700$ | $-1500$ | $-26$ | 1 |
| $f_2 = 1100$ | 100 | $-2.6$ | 1 | $f_2 = 1100\ 2200$ | $-1000$ | $-18$ | 6 | $f_2 = 1100\ 3300$ | $-2100$ | $-35$ | 11 |
| $f_4 = 1300$ | $-100$ | $-2.6$ | 15 | $f_4 = 1300\ 2600$ | $-1400$ | $-25$ | 2 | $f_4 = 1300\ 3900$ | $-2700$ | $-43$ | 5 |
| $f_7 = 1500$ | $-300$ | 0 | 13 | $f_7 = 1500\ 3000$ | $-1800$ | $-31$ | 14 | $f_7 = 1500\ 4500$ | $-3300$ | $-55$ | 15 |
| $f_{11} = 1700$ | $-500$ | $-3$ | 11 | $f_{11} = 1700\ 3400$ | $-2200$ | $-36$ | 10 | $f_{11} = 1700\ 5100$ | $-3900$ | $-90$ | 9 |

TABLE A-continued

| $f_c = 1900$ | −700 | −10 | 9 | $f_c = 1900$ | 3800 | −2600 | −42 | 6 | $f_c = 1900$ | 5700 | +3500 | −59 | 3 |
|---|---|---|---|---|---|---|---|---|---|---|---|---|---|
| Frequency Shifting → | | | | Frequency Shifting → | | | | | Frequency Shifting → | | | | |
| $\exp(j2\pi k \frac{F_L}{F_E})$ | | | | | | | | | | | | | |
| $F_L = 1200$ Hz | $F_L + F$ | | | | $F_L + 2f$ | | | | | $F_L + 3f$ | | | |
| $F_E = 8000$ Hz | (Hz) | dB | | | (Hz) | dB | | | | (Hz) | dB | | |
| | 1900 | −32 | 3 | | 2600 | −42 | | | | 3300 | −55 | 1 | |
| | 2100 | −35 | 5 | | 3000 | −50 | | | | 3900 | −90 | 7 | |
| | 2300 | −37 | 7 | | 3400 | −57 | | | | −3500 | −59 | 13 | |
| | 2500 | −41 | 9 | | −3800 | −70 | | | | −2900 | −47 | 3 | |
| | 2700 | −43 | 11 | | −3800 | −70 | | | | −2300 | −38 | 9 | |
| | 2900 | −47 | 13 | | −3400 | −57 | | | | −1700 | −29 | 15 | |
| | 3100 | −50 | 15 | | −3000 | −49 | | | | −1100 | −19 | 5 | |

According to the SOCOTEL MF system specification, however, the receiver is required to operate normally for a received frequency dispersion Δf of ±20 Hz about the nominal values. This dispersion may lead to shifting the even-numbered order of the harmonic towards the next odd-numbered order below or above. Allowing for the characteristics of the receiver in accordance with the invention, however, the amplitude of the disturbance is equal to $\Delta f/\Delta F_O = \Delta f T_O$, i.e. in the present case 20/100 (−14 dB in level).

According to the system specification, the level of each 2nd harmonic on the input is less than −26 dB and consequently the maximum level of the interference associated with these harmonics remains less than the threshold level of −40 dB.

Part c of table A shows in three columns the levels and orders n of the 3rd harmonics of frequencies $f_0$ to $f_{11}$ and $f_c$ following all the input signal transformations.

In this table, frequencies $F_L − 3f$ are "negative" up to the transform of $3f_{11}$. The transform of $3f_c$, i.e. $F_L − 3f_c = 4500$ Hz, more in absolute value than 4000 Hz, applying the properties of recursive digital filters, is shifted by $+F_E$ to produce $F_E − (F_L − 3f_c) = 3500$ Hz.

Similarly, the "sum" frequencies $F_L + 3f$ are shifted by $−F_E$ as soon as they exceed 4000 Hz.

The orders n of these transformed harmonics on the output of the FFT computer are also determined by applying relationship (3).

If it is assumed that the 3rd harmonic level for each input frequency is less than −26 dB, it is seen that the harmonic for order n=7 is not troublesome, since no "useful" signal on the output of the FFT computer is of this order (see part a of the table). The only 3rd harmonic which could be troublesome is for order 1, but its level is −(26+26) dB= −52 dB, considerably beneath the threshold level of −40 dB.

Figure 7:
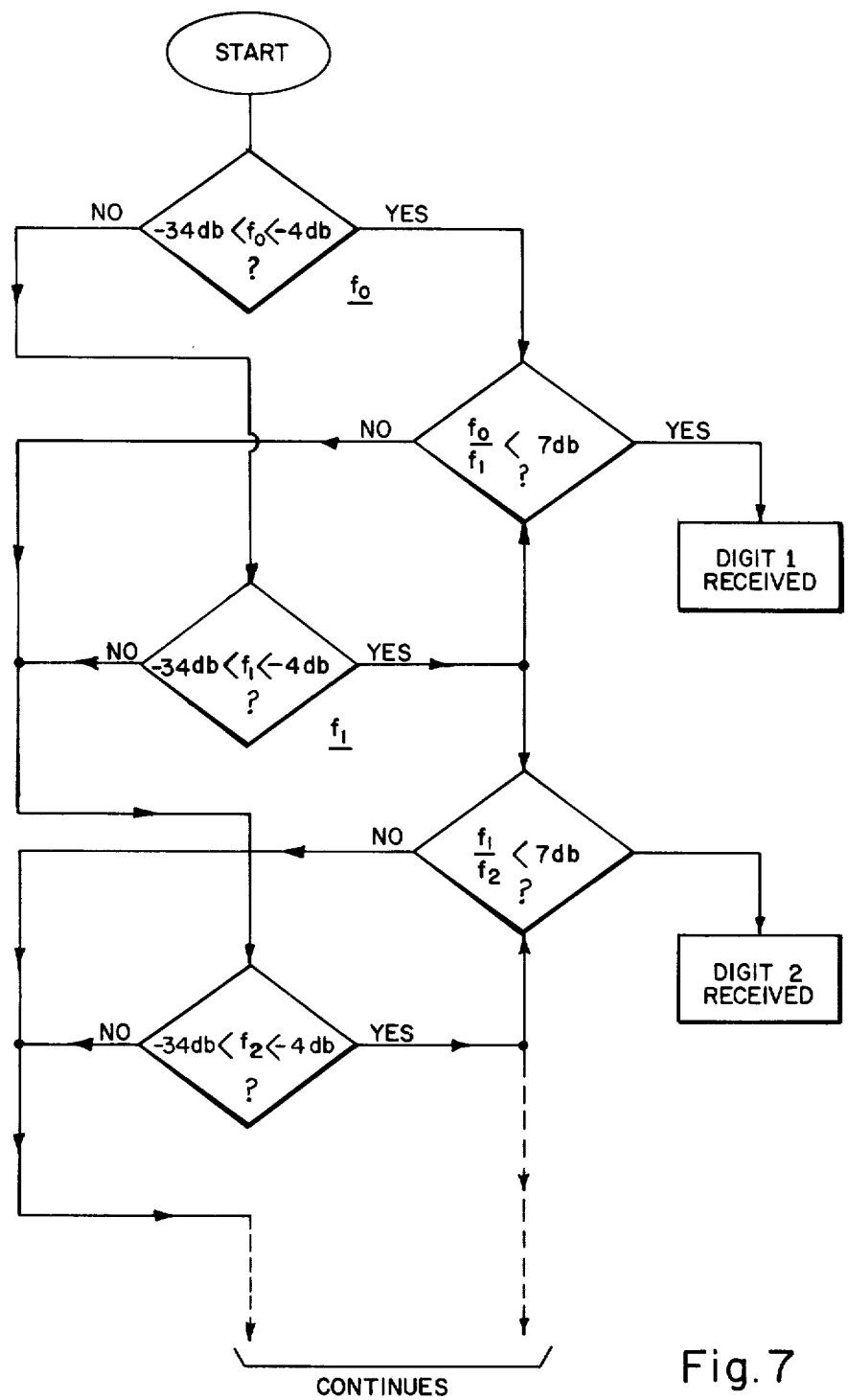
FIG. 7 is a flow chart illustrating operation of the logic circuit 2.9 shown in FIG. 1.

FIG. 7 depicts a flow diagram of the operation performed by logic circuit 2.9 in FIG. 1. Since the flow diagram is repetitive only the first portion has been shown; the rest is entirely analogous. As shown, an incoming signal, $f_o$ say, is first tested to see if it is greater than −34 dB but less than −4 db. If it is, the signal is then compared with the next signal meeting these criteria, $f_1$ say, to see if the levels are within 7 db of one another. If all three of these tests are met, the logic circuit determines that the digit represented by frequencies $f_o$ and $f_1$ must have been transmitted. If any of these tests are foiled, the flow chart proceeds to test all other possible combinations of each 2 frequencies out of the 7 frequencies possible.

The recursive digital low-pass filter is shown schematically in FIG. 3.

In order to synthesize such a filter, it is known how to define the conventional filter having the same response curve as the transfer function |G| defined continuously over the whole of the frequency band considered.

Allowing for analogies which can be pointed out between continuous temporal functions and the same function sampled at frequency $F_E$, the filters relating to continuous temporal functions can be studied by using the symbol s of the Laplace transform, $s^{−1}$ representing an integration, while the digital filters operating on sampled functions can be studied by using a variable $z^{−1}$ which corresponds to a delay $\tau = 1/F_e$.

The transfer function of a "continuous" filter is in the form of a rational function with real coefficients, whose numerator and denominator, being polynomials of s, possess either real roots or conjugate pairs of roots. The poles and zeroes of this function are shown in the rectangular-coordinate s-plane, frequencies f being plotted along the imaginary y axis.

The transfer function of a digital filter can also be expressed in the form a rational function, in which $s = jf$ is replaced by $z = \exp(j2\pi \cdot F/F_E)$, where F represents the frequencies in the z-plane.

Using the reduced variable $p = s/2F_E$, the following relationships may be established:

$$p = \frac{1 - z - 1}{1 + z - 1} \text{ and}$$

$$j \tan(2\pi \cdot F/2F_E) = \frac{1 - z - 1}{1 + z - 1}$$

The zeroes and poles of the transfer function of a digital filter represented in the s-plane are thus transformed to the z-plane. Moreover, the frequencies which are represented in the s-plane on the imaginary axis by successive bands of width $F_E$ centered on $nF_E (n = 0, 1, 2, \ldots \infty)$ are located in the $z^{-1}$-plane on the circumference of a circle of radius 1, frequencies $F \pm nF_E$ being on the same point as frequency F.

By means of the $s \rightleftarrows z^{-1}$ transformation, the synthesis of a digital filter can be based on a continuous filter whose response curve corresponds to that required for the digital filter.

It is convenient to use so-called Tchebycheff filters, which are simple to calculate and produce and which, all other consideration being equal, have a high-slope transition zone.

The response curve of a Tchebycheff type I continuous low-pass filter of order n is defined by:

$$|G|^2 = \frac{1}{1 + \epsilon^2 C_n^2(x)} \quad \text{(relationship 4)}$$

where $x=f/f_p$, $f_p$ being the cut-off frequency.

For calculating the digital filter, $x$ is replaced by $\tan(2\pi \cdot F/2F_E)/\tan(2\pi \cdot F_p/2F_E)$ The Tchebycheff n-order polynomial $C_n$ may be written:

$C_n = \cos(n \text{ arc cos } x)$ for $0 < |x| < 1$
and
$C_n = \cosh(n \text{ arc cosh } x)$ for $|x| > 1$ Over the pass-band $-f_p$ to $f_p$, $|G|^2$ therefore varies from 1 to $1/(1+\epsilon^2)$, while beyond $|f_p|$, $|G|^2$ decreases monotonically from $1/(1+\epsilon^2)$ to 0 for $F=\pm F_E/2$.

The filter transmission bands are therefore defined by $nF_E \pm f_p$, and the infinite-attenuation frequencies by $nF_E \pm F_E/2$.

It is seen from relationship 4 that $\epsilon^2$ and $n$ are available for modelling the filter whose response has been defined. By selecting $A_{max}=3$ dB of the pass-band and $A_{min}=30$ dB for $F=1900$ Hz in the example of the SOCOTEL MF system, $\epsilon^2=1$ and $n=2$ are obtained, and $|G|^2$ is then given by:

$$|G|^2 = \frac{1}{1 + (2x^2 - 1)^2}$$

where $\tan(2\pi \cdot f_p/2F_E)=0.2$.

The poles of $|G|^2$ correspond to $x=\pm 2^{\frac{1}{4}} e^{\pm j\pi/8}$ whence $\tan 2\pi \cdot F_i/F_E = \pm 0.155 \pm j0.064$.

It may be established from the relationship $j \tan(-2\pi \cdot F_i/2F_E)=(1-z-1)/(1+z-1)$ that there are four roots of $z-1$ disposed as two pairs of conjugate roots.

One of the pairs corresponds to a value $|z^{-1}|$ less than 1, and therefore to an unstable system.

The other pair provides the desired stable filter. The transfer function in terms of $z^{-1}$ can then be written in the form:

$$G(z^{-1}) = K \frac{(1+z^{-1})^2}{(z^{-1} - (z_0^{-1}))(z^{-1} - (z_0^{-1})^*)}$$

The term $(1+z^{-1})^2$ is introduced in the numerator, since the attenuation is infinite when $z^{-1}=-1$, corresponding to a 2nd-order zero.

K is determined by adopting $z^{-1}=1$ (F=0).

In the case considered, $z_O^{-1} = 1.08 + j0.343$.

By developing the denominator, $G(z^{-1})$ may also be written in the form:

$$G(z^{-1}) = M \frac{(1+z^{-1})^2}{1 + \alpha z^{-1} + \beta z^{-2}}$$

where in this case
M = 1/83
$\alpha = -1.682$
$\beta = 0.778$

In the diagram in FIG. 3, signal $U_e$ on the frequency shifting device output is fed to an adder 3-1, which also receives signal $U_2$ delayed by an interval $\tau = 1/F_E$ by the delay device 3-5 and multiplied $(-\alpha)$ in multiplier 3-3, and the same signal $U_2$ delayed by an additional time $\tau$ by 3-6, identical with 3-5, and multiplied by $(-\beta)$ in multiplier 3-4.

$U_2$ is then added in adder 3-2 to the output signal of 3-5 in order to produce the signal $U_3=U_2(1+z^{-1})$.

The transfer function $$\frac{U_3}{U_e} = \frac{1 + z^{-1}}{1 + \alpha z^{-1} + \beta z^{-2}}$$

$U_3$ is multiplied by M in multiplier 3-7, and $MU_3$ is added in adder 3-9 to the same $MU_3$ delayed by $\tau$ in 3-8 identical with 3-5 and 3-6. Signal $U_S$ obtained on the output of 3-9 is that applied either to the second digital filter or more generally to the FFT computer.

$$U_S/U_e = M(1+z^{-1})$$

whence the overall transfer function:

$$G(z^{-1}) = \frac{U_S}{U_e} = \frac{M(1+z^{-1})^2}{1 + \alpha z^{-1} + \beta z^{-2}}$$

which is the required function for producing the recursive digital low-pass filter having the characteristics represented by curve 3-10. It is seen that this filter possesses three multipliers and three adders. Since the system requires two indentical filters 2-31 and 2-32 (FIG. 2), the filtering requires a total of six multipliers and six adders.

Remark

The choice of $n=2$ and the attenuation of 30 dB on the input of the attenuated zone results in adopting $\epsilon^2=1$, whence $A_{max}=3$ dB.

The means for correcting the effects of attenuation variation over the pass band on the output of the FFT computer are described below.

If, however, it is desirable to avoid this correction, it is possible to adopt for example $n=4$ and $\epsilon^2=0.05$ ($A_{max}=0.2$ dB). The input attenuation of the attenuated zone then reaches 56 dB.

The disadvantage of this solution is due to the fact that each filter possesses five multipliers and five adders instead of three multipliers and three adders for the case of $n=2$.

FFT Computer

The general equation for the DFT transformed by frequency shifting may be written in complex notation:

$$Y(n) = \frac{1}{N} \sum_{k=0}^{N-1} y(k)\exp(-j \cdot 2\pi/N \cdot kn)$$

where $N=16$ and $k/n=0, 1, 2, \ldots 7, 8, \ldots 14$ and 15.

It is convenient to replace $\exp(-j \cdot 2\pi/16 \cdot kn)$ by $W^{kn}$, where $W=\exp(-j \cdot \pi/8)$. Whence the new equation:

$$Y(n) = \frac{1}{16} \sum_{k=0}^{15} y(K) W^{kn}$$

$y(k)$ and $Y(n)$ are complex numbers and the determination of terms $Y(n)$ requires two associated calculations, represented by 2-62 and 2-61 in FIG. 2, one producing the real parts $Y_r(n)$ and the other producing the imaginary parts $Y_i(n)$:

$$Y(n) = Y_r(n) + jY_i(n)$$

For both calculations, the determination of each term corresponding to two associated values of n and k requires in general 4 multiplications and 2 additions.

In order to calculate all the terms Y(n), a conventionally designed DFT computer should perform $4N^2$ multiplications and $2N^2$ additions, i.e. 1024 multiplications and 512 additions in the present case.

Since $N=16=2^4$, the known fast calculations method (FFT) by "temporal decimation" due notably to Cooley enables Y(n) to be determined with a reduced number of operations.

The method consists in replacing in a first transformation $Y_1$ the 16-term component Y(n) by two 8-term groups X(n) and Z(n), the terms being associated such that $Y(n)=X(n)+W^8Z(n)$, i.e $Y(n)=X(n)-Z(n)$.

By means of three other transformations $Y_2$, $Y_3$ and $Y_4$, which use the same principle of division and take account of the "gains" $W^d$ (d=0, 1, 2 ... 14, 15), it is possible to determine Y(n) with a considerably reduced number of additions and multiplications.

In order to obtain these transformations, it is first seen that K, which in the present case varies 0 to 15, can be written in binary notation:

$$k = k_3k_2k_1k_0$$

similarly $$n = n_3n_2n_1n_0$$

If time-division samples are fed to the computer input in their natural order from 0 to 15, the spectral components Y(n) on the output occur overlapped in an order defined by $n'=n_0n_1n_2n_3$.

Conversely, to avoid this overlapping on the output, the time-division samples are introduced in the order defined by $k'=k_0k_1k_2k_3$.

From the graphical point of view, the four transformations allowing the FFT calculation have the structure of a Cooley flow graph. They can be represented in the general case by four columns possessing eight single meshes, four double meshes, two quadruple meshes and one octuple mesh.

By applying the relationship $W^{d+8}=-W^d$, the "gains" $W^d$ of the mesh branches may be written as follows:

Column 1: $W^{d0}$, where $d_0=8k_0n_0$
allowing for the fact that in the particular case considered the values of n are odd numbers: $n_0=1$.

The only value to be considered is $W^8=-1$, since $W^0=1$ should be applied to the branches not involved in the determination of the odd-numbered spectral components Y(n).

$W^8=-1$ does not correspond to a multiplication.

Column 2: $W^{d1}$, where $d_1=4k_1(2n_1+n_0)$
Since $(2n_1+n_0)$ is an odd number, the only value to be considered is $W^4=-j$.

Here again, $-j$ does not correspond to a multiplication. Applied to an imaginary component of $Y_1$, it produces 1 for the real component of $Y_2$. Similarly, applied to a real component of $Y_1$, it produces 1 for the imaginary component of $Y_2$.

Column 3: $W^{d2}$, where $d_2=2k_2(4n_2+2n_1+n_0)$
$(4n_2+2n_1+n_0)$ is an odd number and the only "gains" to be considered are:

$$W^2 = \cos\frac{\pi}{4} - j\sin\frac{\pi}{4} = \frac{\sqrt{2}}{2} - j\frac{\sqrt{2}}{2}$$

$$W^6 = \cos\frac{3\pi}{4} - j\sin\frac{3\pi}{4} = -\frac{\sqrt{2}}{2} - j\frac{\sqrt{2}}{2}$$

$W^2$ and $W^6$ are "gains" of branches which result in the multiplication of complex quantities.

Column 4: $W^{d3}$, where $d_3=k_3n$
n is an odd number and the "gains" to be considered are:

$$W^1 = \cos\frac{\pi}{8} - j\sin\frac{\pi}{8}$$

$$W^3 = \cos\frac{3\pi}{8} - j\sin\frac{3\pi}{8}$$

$$W^5 = \cos\frac{5\pi}{8} - j\sin\frac{5\pi}{8}$$

$$W^7 = \cos\frac{7\pi}{8} - j\sin\frac{7\pi}{8}$$

FIG. 4 with the simplifications due to the particularities of the data processed shows the structure of the FFT computer. Since only the odd terms Y(n) are to be computed, in each mesh column only the half of each mesh is used, which results in halving the number of operations to be performed.

As a result of the calculation, the following are formed in the order of increasing n:

$$Y_r(n) = A_f\cos\phi_f$$

and $$Y_i(n) = A_f\sin\phi_f$$

i.e. $Y(n)=A_f\exp(j\phi_f)$.

The two bottom rows in FIG. 4 indicate for each of the four transformations the number of additions (+) and multiplications (x) required for producing the twelve values of $A_f\cos\phi_f$ and $A_f\sin\phi_f$, i.e. a total of 64 additions and 32 multiplications.

Since the number of SOCOTEL MF code frequencies is 6, determining the 6 digital values $A_f^2$ requires 12 multiplications, i.e. six for one of the calculations determining $A_f^2\cos^2\phi_f$ and six for the other determining $A_f^2\sin^2\phi_f$, and then 6 additions:

$$A_f^2\sin^2\phi_f + A_f^2\cos^2\phi_f = A_f^2$$

These numbers of operations are indicated at the bottom of FIG. 4 in the column marked $A_f^2$. Determination of the six digital values $A_f^2$ from the time-division data fed to the FFT computer requires a total of 70 additions and 44 multiplications.

It is possible from these figures to reach certain conclusions by comparing several solutions:

(a) that of the invention
(b) the same but in fine a general-purpose computer performing the DFT calculation for $N_T=16$
(c) a special-purpose computer for calculating the FFT, which registers the digital data as received and calculates the term $A_f^2$ for N=80 ($80=2^4\times 5$), but for odd values of n only
(d) a general-purpose computer registering the digital data as received and calculating the terms $A_f^2$ by the DFT method for N=80

(e) a computer possessing two filter channels, each consisting essentially of a band-pass filter isolating the six code frequencies and then in parallel six digital filters each responding to one of the six frequencies. It is assumed that these are Tchebycheff type I filters, each requiring three multiplications and three additions.

Considering that:

in solutions a and b, the frequency shifting and filter operations only require the processing of 80 signals during the interval $T_0 = 10$ ms, in solutions c, d and e, all operations require the processing of 80 signals during this same interval $T_0$, the results summarized in the following tables are obtained:

Multiplications

| Solutions | Frequency Shifting | Filtering | DFT | FFT | Total | in 1 s Total |
|---|---|---|---|---|---|---|
| | | ← ... in 10 ms ... → | | | | |
| a | 2 × 80 | 2 × 3 × 80 | | 44 | 684 | 68,400 |
| b | 2 × 80 | 2 × 3 × 80 | 1,056 | | 1,696 | 169,600 |
| c | | | | 3,200 | 3,200 | 320,000 |
| d | | | 51,840 | | 51,840 | 5,184,000 |
| e | | 7 × 2 × 3 × 80 | | | 3,360 | 336,000 |

Additions

| Solutions | Frequency Shifting | Filtering | DFT | FFT | Total | in 1 s Total |
|---|---|---|---|---|---|---|
| | | ← ... in 10 ms ... → | | | | |
| a | | 2 × 3 × 80 | | 70 | 550 | 55,000 |
| b | | 2 × 3 × 80 | 528 | | 1,008 | 100,800 |
| c | | | 1,600 | | 1,600 | 160,000 |
| d | | | 25,920 | | 25,920 | 2,592,000 |
| e | | 7 × 2 × 3 × 80 | | | 3,360 | 336,000 |

These two tables clearly show that the advantage of the solution in accordance with the invention lies in the fact that the number of samples for each period of 10 mn can be reduced to a value $N_T$ by frequency shifting, allowing simple application of the FFT algorithm.

It is again seen that the number of operations in one second corresponds to that of the successive processing of a hundred multifrequency signal transmission channels.

Validation Means

In the event of receiving digital signals simultaneously on several outputs of orders $n = 1, 3, 5, 11, 13, 15$, two of the six corresponding digital values $A_j^2$ cannot be recognized as constituting one of the codes unless they lie between certain absolute and relative limits.

This validation function is performed by a decision-taking computer which:

places the received terms $A_j^2$ in increasing order: $A_i^2 > A_j^2 > A_k^2 > A_l^2 > A_m^2 > A_n^2$ identifies the two highest values $A_i^2$ and $A_j^2$.

The absolute validation criteria in accordance with the SOCOTEL MF system specification are written as follows, representing the limits by their levels expressed in dBm and ratios in dB in order to simplify the description:

$-4 \text{ dBm} > A_i^2 > -34 \text{ dBm}$ $-4 \text{ dBm} > A_j^2 > -41 \text{ dBm}$ $A_i^2 / A_j^2 < 7 \text{ dB}$ $A_i^2 + A_j^2 > K(A_k^2 + A_l^2 + A_m^2 + A_n^2)$ where K is an adjustable coefficient representing the limiting signal/noise ratio.

The validation algorithm consists in checking the above inequalities.

The Problem of the 4-Wire⇌2-Wire Analogue Changing in the Connections Between Digital Senders and Digital Receivers Until now, only 4-wire connections have been considered, as shown in FIG. 1.

In networks with changes from 4-wire to 2-wire operation, imperfect balancing may result from imperfections of the coupling device (differential, set of directional filters). The result is that in a terminal unit, the control frequency $f_c$ sent over the transmit channel is received on the receive channel. According to the system specification, however, the receive level should be 1.5 Nepers (13 dB) below the transmit level in the worst case: 0.8 Nepers ($-7$dBm). Moreover, the digital filters proposed by the invention provide an attenuation of 10dB. The interference level represented by $f_c$ is thus $-30$ dBm, i.e. 4 dB above the weakest signal ($A_i^2 = -34$ dBm). In principle, this is not troublesome, since on the output of the RFT computer $f_c$ is in position $n = 9$, which is not used. A large variation in $f_c$ is required to shift $f_c$ to a position already occupied. The tolerances allowed by the specification for the transmit values of $f_c$ (1900 Hz $\pm$ 6 Hz) are too narrow for this situation to arise.

If, however, it is desired to avoid in any case the effects of receiving $f_c$, it is merely necessary to use the auxiliary low-pass digital filters 2-5 shown in FIG. 2.

These filters operating at the sampling frequency of $F_T = 1600$ Hz can also behave as Tchebycheff 2nd-order filters (see FIG. 3).

If $|G|^2 = 1/1 + 0.2 \, C_2^2(x)$ is the response of the corresponding analogue filter, the attenuation at 700 Hz (the transform of $f_c$ by heterodyning) is $-20$ dB. The attenuation over the pass-band 0 to 500 Hz oscillates between 0 and $-0.8$ dB. Allowance must obviously be made in the evaluation for the correction coefficients $\alpha$ of FIG. 2 (see 2-8).

These extremely efficient filters require only $2 \times 3 \times 16$ multiplications and $2 \times 3 \times 16$ additions during a 10 ms interval, i.e. 9600 multiplications and 9600 additions per second, which add to the 68,400 multiplications and 55,000 additions of the device not fitted with these accessory filters.

Application to the $R_2$ System

This multifrequency signalling system is essentially characterized by the fact that for exchanging signals the circuit is terminated at both ends by equipments allowing the sending and receiving of signals and operating by mutual control.

The general diagram for the 4-wire system is that of FIG. 1, except that the control frequency $f_c$ is also replaced by a signal comprising two frequencies out of six.

The six frequencies in the forward direction are $f_0=1380$, $f_1=1500$, $f_2=1620$, $f_3=1740$, $f_4=1860$ and $f_5=1980$ Hz, and the six frequencies in the backward direction are $f_0=1140$, $f_1=1020$, $f_2=900$, $f_3=780$, $f_4=660$ and $f_5=540$ Hz.

At the receive end, the signal is recognized on two and only two frequencies. During the release, no frequency should be received.

It is immediately seen that one of the main difficulties of operating the system resides in the change from 4-wire to 2-wire operation, since the forward code receiver must not be activated by the backward code sender, and vice versa.

According to the $R_2$ system specification, there are two types of receiver test summarized in the following table, which defines the absolute and relative levels of the two frequencies constituting a code, as well as the maximum error $\Delta f$ with respect to the nominal frequency f.

|  | $\Delta f$ | Absolute Level | Relative Level |
|---|---|---|---|
| Type A | ±5 Hz | −5 dBm → −20 dBm | <3 dB |
| Type B | ±10 Hz | −5 dBm → −35 dBm | <7 dB |

Interference at the receive end may result from residual signalling frequencies produced at the transmit end and particularly harmonics whose levels are less than 37 dB beneath the highest level code signal.

When no multifrequency signal is transmitted, the total disturbance level at the receive end should be less than −55 dBm, and when a multifrequency signal is sent, the total level of the disturbance should be more than 23 dB beneath the test signal frequency having the highest level.

The receive device according to the invention is now described, following the same stages as for the SOCOTEL MF system.

Reception of Forward Signals

If the reception of forward signals is considered, adopting the notations used in the description of characteristics:

$\Delta F_i = 120$ Hz, $p=3$, therefore $\Delta F_0 = 40$ ($T_0 = 25$ ms) a local frequency of $F_L = 1700$ Hz is adopted.

The transposed frequencies extend from 320 Hz ($F_L - f_0$) to −280 Hz ($F_L - f_5$).

$F_T = 800$ Hz ($F_T > 640$ Hz) is adopted whence $N_T = 20$ and $F_E/F_T = 10$.

It is seen that the period $T_i$ before heterodyning is 50 ms.

For frequency shifting, the phase $\phi = 2\pi k \cdot F_L/F_E$ (k being the series of whole numbers).

$F_L/F_E$ is reduced to the irreducible fraction $g/h = 17/80$.

All the useful values of constituting the series of 80 values are obtained: $17/80\pi \times 0$, $17/80\pi \times 1$ ... $17/80\pi \times 78$, $17/80\pi \times 79$. These values stored in the frequency shifting multipliers shown in FIG. 2 are used five times during each period $T_i$ of 50 ms ($N_i = 400$).

After frequency shifting, the two conjugate low-pass filters 2-31 and 2-32 shown in FIG. 2 for eliminating "sum" components and certain interference have the same structure as those previously described (see FIG. 3).

By adopting a 2nd order filter with a 3 dB oscillation over the −320 to +320 Hz band, the transfer function $G(z^{-1})$ is determined by the following values:

$M = 1/219$ $\alpha = -1.823$ $\beta = 0.859$

The response curve of the filter in dB is shown in FIG. 3 (3-11). Part a of table B indicates in four columns the frequencies f, the frequencies $F_L - f$ and $F_L + f$, the attenuation caused by the filters and finally the order n following the FFT, with $N_T = 20$ and $F_T = 800$ Hz.

It is seen that all the "sum" component levels are more than 50 dB down and create no disturbance.

Part b of table B indicates in four columns the 2nd harmonics of frequencies f, the frequencies $F_L - 2f$ and $F_L + 2f$, the attenuation due to the filters and finally the order n following the FFT.

TABLE B

| a | | | | b | | | | c | | | |
|---|---|---|---|---|---|---|---|---|---|---|---|
| f | Filtering | | FFT $N_T = 20$ $F_T = 800$ Hz | 2nd Harmonic | Filtering | | FFT | 3rd Harmonic | Filtering | | FFT |
| f (Hz) | $F_L - f$ | dB | n | 2f (Hz) | $F_L - 2f$ | dB | n | 3f (Hz) | $F_L + 3f$ | dB | n |
| $f_0 = 1380$ | 320 | −3 | 8 | 2760 | −1060 | −27 | 13,5 | 4140 | −2160 | −45 | 6 |
| $f_1 = 1500$ | 200 | 0 | 5 | 3000 | −1300 | −33 | 7,5 | 4500 | −1800 | −38 | 15 |
| $f_2 = 1620$ | 80 | −2,8 | 2 | 3240 | −1540 | −37 | 1,5 | 4860 | −1440 | −36 | 4 |
| $f_3 = 1740$ | −40 | −3 | 19 | 3480 | −1780 | −41 | 15,5 | 5220 | −1080 | −29 | 13 |
| $f_4 = 1860$ | −160 | 0 | 16 | 3720 | −2020 | −44 | 9,5 | 5580 | −720 | −21 | 2 |
| $f_5 = 1980$ | −280 | −3 | 13 | 3960 | −2260 | −47 | 3,5 | 5940 | −360 | −5 | 11 |
| Frequency Shifting → $\exp(j2\pi k \frac{F_L}{F_E})$ $F_L = 1700$ Hz $F_E = 8000$ Hz | | | | Frequency Shifting → | | | | Frequency Shifting → | | | |
| | $F_L + f$ | dB | | | $F_L + 2f$ | dB | | | $F_L - 3f$ | dB | |
| | 3080 | −58 | 17 | | −3540 | −72 | | | −2440 | −50 | |
| | 3200 | −61 | 0 | | −3300 | −65 | | | −2800 | −55 | |
| | 3320 | −64 | 3 | | −3060 | −58 | | | −3160 | −60 | |
| | 3440 | −68 | 6 | | −2820 | −56 | | | −3520 | −70 | |
| | 3560 | −73 | 9 | | −2580 | −52 | | | −3880 | −95 | |
| | 3680 | −79 | 12 | | −2340 | −48 | | | +3760 | −85 | |

The highest interference level due to a 2nd harmonic is −37 dB−27 dB, i.e. 64 dB beneath the highest level signal.

Part c of the table B indicates in four columns the 3rd harmonics of frequencies f, the frequencies $F_L-3f$ and $F_L+3f$, the attenuation due to the filters and the order n following the FFT.

It is seen that when $F_L-3f$ is less than −4000 Hz, $F_L-3f$ should be replaced by $F_L-3f+F_E$.

Similarly, when $F_L+3f$ exceeds 4000 Hz, it should be replaced by $F_L+3f-F_E$.

Following these replacements, the troublesome harmonics are those transformed into $F_L+3f$, whence the change-over between $F_L+3f$ and $F_L-3f$ in the second column.

Following the FFT, the 3rd harmonic appears at n=11 and has no effect on the code signals.

Moreover, it has a level of −37 dB−5 dB, i.e. 42 dB beneath the highest level signal.

The 3rd harmonic at n=2 (corresponding to $f_2$) has a level −37 db−20 db=57 dB.

That at n=13 (corresponding to $f_5$) has a level −37 dB−29 dB−66 dB.

The problem of the spurious effect of backward signals on the reception of forward signals is examined later. It occurs in the event of changing from 4-wire to 2-wire operation.

Reception of Backward Signals

The backward signal receiver has the same characteristics as the forward signal receiver, with $F_L-860$ Hz.

In this case, $F_L/F_E=g/h=3/400$

All the useful values of $\phi$ are obtained by forming the series of 400 values:

$$43/400\pi \times 0, \ 43/400\pi \times 1 \ldots 43/400\pi \times 398, \ 43/400\pi \times 399$$

These values stored in the frequency shifting multipliers 2-2 shown in FIG. 2 are used once during each 50 ms period $T_i$ ($N_i=400$).

The following digital filters are exactly the same as those used for the backward signal receiver.

Table C, having the same structure as table B, indicates the results obtained relating to the attenuation of the various unwanted signals (harmonics, "sum" components) and the order n in the FFT at $F_T=800$ Hz.

It is seen that the only harmonic likely to be troublesome is the 2nd harmonic of $f_4$ which corresponds to n=8.5, since allowing for a ±10 Hz tolerance for f, the possible variation of 2f is ±20 Hz. Under these conditions, the position of the component corresponding to the 2nd harmonic of $f_4$ may be transposed to n=8, which corresponds to $f_0 \cdot F_L-2f_4$, however, is then −440 Hz, which corresponds to an attenuation of −10 dB, i.e. a total of −37 dB−10 dB+3 dB=−44 dB with respect to $f_0$.

TABLE C

| a | | | | b | | | | c | | | |
|---|---|---|---|---|---|---|---|---|---|---|---|
| | Filtering | | FFT $N_T=20$ $F_T=$ 800 Hz | 2nd Harmonic | Filtering | | FFT | 3rd Harmonic | Filtering | | FFT |
| f (Hz) | $F_L-f$ | dB | n | 2f (Hz) | $F_L-2f$ | dB | n | 3f (Hz) | $F_L-3f$ | dB | n |
| $f_0=1140$ | −280 | −3 | 13 | 2280 | −1420 | −36 | 4,5 | 3420 | −2560 | −50 | 16 |
| $f_1=1020$ | −160 | 0 | 16 | 2040 | −1180 | −32 | 10,5 | 3060 | −2200 | −45 | 5 |
| $f_2=900$ | −40 | −3 | 19 | 1800 | −940 | −26 | 16,5 | 2700 | −1840 | −40 | 14 |
| $f_3=780$ | 80 | −3 | 2 | 1560 | −700 | −22 | 2,5 | 2340 | −1480 | −37 | 3 |
| $f_4=660$ | 200 | 0 | 5 | 1320 | −460 | −11 | 8,5 | 1980 | −1120 | −31 | 12 |
| $f_5=540$ | 320 | −3 | 8 | 1080 | −220 | 0 | 14,5 | 1620 | −760 | −22 | 1 |
| Frequency Shifting → | | | | Frequency Shifting → | | | | Frequency Shifting → | | | |
| $\exp(j2\pi k \frac{F_L}{F_E})$ $F_L=860$ Hz $F_E=8000$ Hz $F_L+f$ | | dB | | | $F_L+2f$ | dB | | | $F_L+3f$ | dB | |
| | 2000 | −43 | 10 | | 3140 | −58 | | | −3720 | −80 | |
| | 1880 | −42 | 7 | | 2900 | −56 | | | +3920 | −100 | |
| | 1760 | −40 | 4 | | 2660 | −58 | | | 3560 | −70 | |
| | 1640 | −38 | 1 | | 2420 | −48 | | | 3200 | −60 | |
| | 1520 | −36 | 18 | | 2180 | −45 | | | 2840 | −55 | |
| | 1400 | −35 | 15 | | 1940 | −42 | | | 2480 | −50 | |

The use of an auxiliary filter is therefore not indispensable. If, however it is required to remove the effect of this spurious signal completely, it is possible to introduce two auxiliary digital filters such as 2-51 and 2-52 which provide additional attenuation at 440 Hz. It is not possible to use filters processing 800 samples per second, since the infinite-attenuation frequency is 400 Hz and, because of the symmetry, since the attenuations at 440 Hz and 360 Hz are equal, this last frequency is too close to 320 Hz, the maximum frequency of the passband.

Filters processing 1600 samples per second are therefore used. They are inserted in the system shown in FIG. 2 and require the following modifications: counters 2-41 and 2-42 are 5-bit counters and filters 2-5 are followed by two 2-bit counters not shown.

These auxiliary filters can also behave as Tchebycheff 2nd-order filters.

If $/G/^2=1/1+C_2^2(x)$ is the response of the corresponding analogue filter, with $f_p=320$ Hz, an additional attenuation of 10 dB is produced at 440 Hz.

As already mentioned, it is necessary to allow in the coefficients $\alpha$ of FIG. 2 for the attenuation produced by these auxiliary filters in the passband.

The Problem of the 4-Wire⇌2-Wire Analogue Changing in the Connections Between Digital Senders and Digital Receivers In the case of a change from 4-wire to 2-wire operation, it is necessary to examine how forward transmission can affect backward reception and vice versa.

The effects of the forward code on the backward code are shown in part a of table D, and the reverse effects are shown in part b.

If $f_0 = 1380$ Hz is sent at a level of $-10.5$ dBm, the spurious signal in position $n=7$, allowing for the minimum decoupling of $-15$ dB of the 4-wire/2-wire conversion device, and an attenuation of $-15$ dB due to the filter, has a maximum level of $-40.5$ dBm, and is therefore less than the lowest signal level of $-35$ dBm.

The situation is the same in the other case.

Calculation of FFT

The two associated calculations (cosine channel and since channel) of the FFT for the forward signals, for example, are required to process $N_T = 20$ samples in 25 ms ($N_T = 2^2 \times 5$).

$A_i^2$ are corrected by one of the multiplying coefficients $\alpha$, which correct the relative attenuations due to the digital filters 2-3 and, if present, 2-5 shown in FIG. 2, i.e. a maximum of six additional multiplications.

For the final calculation from the digital filter output signals, this results in a total of 96 multiplications and 120 additions every 25 ms, i.e. 3920 multiplications and 4800 additions (8720 operations) per second.

As in the case of the SOCOTEL MF system, the heterodyne and filter operations require 64,000 multiplications and 48,000 additions. In the present case, however, this number of operations allows the successive processing of 40 multifrequency signal transmission channels only.

The calculation of the backward signals is performed in the exactly the same manner.

The validation means are comparable with those used for the SOCOTEL MF system, the only differences

TABLE D

| | a | | | | b | | |
|---|---|---|---|---|---|---|---|
| | Filtering | | FFT | | Filtering | | FFT |
| f Hz | $F_L - f_0$ | dB | n | f | $F_L - f_0$ | dB | n |
| $f_0 = 1380$ | $-520$ | $-15$ | 7 | $f_0 = 1140$ | 560 | $-16$ | 14 |
| $f_1 = 1500$ | $-640$ | $-18$ | 4 | $f_1 = 1020$ | 680 | $-19$ | 17 |
| $f_2 = 1620$ | $-760$ | $-21$ | 1 | $f_2 = 900$ | 800 | $-22$ | 0 |
| $f_3 = 1740$ | $-880$ | $-24$ | 18 | $f_3 = 780$ | 920 | $-25$ | 3 |
| $f_4 = 1860$ | $-1000$ | $-27$ | 15 | $f_4 = 660$ | $+1040$ | $-28$ | 6 |
| $f_5 = 1980$ | $-1120$ | $-30$ | 12 | $f_5 = 540$ | 1160 | $-31$ | 9 |
| Frequency Shifting → | | | | Frequency Shifting → | | | |
| $F_L = 860$ Hz | | | | $F_L = 1700$ Hz | | | |
| $F_E = 8000$ Hz | | | | $F_E = 8000$ Hz | | | |

Reference should be made to the diagram in FIG. 5, showing the organization of the associated calculations assembled into a single calculation with complex notations. The time-division samples are applied to the 20 inputs of the computer, divided into five groups of 4 samples. The input order k of each of the 5 groups are $k=0, 1, 2, 3, 4$, and within each group the orders are $k+0$, $k+10$, $k+5$ and $k+15$, the overlapping in the input orders reestablishing the order in each group before the final transformation.

Each group comprises Cooley flow graphs for $N=4$, consisting of two single meshes and one double mesh in cascade.

The operations to be performed for each group comprise only additions, since for $N=4$ the only values of $\exp(-j2\pi \cdot nk/4)$ are 1, $-j$ and $-1$.

It is seen that the symbol $-j$ does not correspond to a multiply operation.

The intermediate transformations in column 3 are marked $Y_{i, r}$, where $i=0, 1, 2, 3, 4$ and $r=0, 1, 2, 3$.

The orders n of the useful outputs are shown in column "n". Orders $n=19$, 16 and 13 are replaced by $(n-N)$, i.e. $-1$, $-4$ and $-7$.

Outputs $Y(2)$, $Y(5)$, $Y(8)$, $Y(-1)$, $Y(-4)$ and $Y(-7)$, wich define the six components $A_f \exp(-j\phi_f)$ for $f_2$, $f_1$, $f_0$, $f_3$, $f_4$ and $f_5$ respectivey, are obtained by the operations represented on the right side of FIG. 5.

These last operations require $20 \times 4 = 80$ multiplications and 40 additions. These preliminary operations for obtaining the terms $Y_{i, r}$ require 80 additions, i.e. a total of 80 multiplications and 120 additions for all of the associated pairs of calculations.

The terms $A_f \sin\phi_f$ and $A_f \cos\phi_f$ are then squared, and the results are added by computers 2-7 and 2-8 shown in FIG. 2 (12 multiplications and 6 additions). The terms being the absolute and relative level limits of the signals recognized.

Although the principles of the present invention are described above in connection with specific practical examples it should be clearly understood that the said description is given as an example only and does not limit the scope of the invention.

I claim:

1. A digital receiver for multifrequency signals, each multifrequency signal comprising the sum of several sinusoids which are sampled at a frequency $F_E$, then quantified and linearly encoded, each sinusoid having the form $A_f \sin 2\pi ft$, whose frequencies f define a code and are selected out of q predetermined frequencies constituting an arithmetical series based on $\Delta F_i = p\Delta F_O$ (p being an integer, $\Delta F_O$ being a divisor of $F_E$, said receiver including means for calculating the fast Fourier transform (FFT) of an input signal, characterized in that said receiver includes in series connection:

(a) digital frequency shifting means for generating a frequency $F_L$ at or close to the center of the band of said q frequencies, and for changing each of said q frequencies to a frequency $F_L - f$, whose absolute value is a multiple of $\Delta F_O$;

(b) low-pass digital filtering means with a cut-off frequency $f_p$ equal to the highest of the frequencies $|F_L - f|$, for attenuating the components of frequencies $F_L + f$ due to frequency shifting to a level beneath a predetermined level $A_{min}$;

(c) means, connected to the output of said filtering means, for counting up to r and for retaining one sample of the multifrequency signal out of every r samples taken, r being chosen equal to $F_E/F_T$, where $F_T$ is a divisor of $F_E$ greater than $2f_p$ and a multiple of $\Delta F_O$,
said fast Fourier transform calculation means being connected to the output of said counting means and including $N_T = F_T/\Delta F_O$ inputs fed, each second, with $F_T$ samples obtained from said filtering and said counting means, and v outputs, each corresponding to one, and only one, frequency f of an input digital signal.

2. A digital receiver in accordance with claim 1, in which $\Delta F_i$ is a divisor of $F_E$, characterized by the fact that $F_L$ is chosen equal to one of the two center frequencies of the spectrum of the q frequencies if q is even, or to the center frequency if q is odd, $f_p$ assuming the values $(q/2)\Delta F_i$ (q even) or $(q-1/2)\Delta F_i$ (q odd), and $N_T$ being equal to $F_T/\Delta F_i$.

3. A digital receiver in accordance with claim 1, in which $\Delta F_O = 2\Delta F_O'$ ($\Delta F_O$ and $\Delta F_O'$ being divisors of $F_E$) and in which q is even, characterized by the fact that $F_L$ is equal to the center frequency of the band of the q frequencies, $f_p$ assuming the value $(q-2)\Delta F_O'$ and $N_T$ being equal to $F_T/\Delta F_O'$.

4. A digital receiver in accordance with claim 1, in which $\Delta F_i = p\Delta F_O (p>2)$, $\Delta F_O$ being in this case the highest common divisor of $F_E$ and $\Delta F_i$, characterized by the fact that:
- if p and q are even, $F_L$ is equal to the center frequency of the band of the q frequencies, $f_p$ assuming the value $[p(q-1)/2]\Delta F_O$,
- if p is odd and q is even, $F_L$ is $\pm\Delta F/2$ from the center frequency of the band of the q frequencies, $f_p$ assuming the value $[p(q-1)+1/2]\Delta F_O$,
- if q is odd, $F_L$ is chosen equal to the center frequency of the spectrum of the q frequencies, $f_p$ assuming the value $[p(q-1)/2]\Delta F_O$.

5. A digital receiver in accordance with claim 1, in which the digital frequency shifting means is divided into first and second similar computing elements, said first and second computing elements being characterized by:
- a read-only memory comprising a plurality of memory cells functionally arranged in rows and columns containing the address of a quantified value of the phase $\phi = 2\pi k \times F_L/F_E$ with respect to that of the local frequency $F_L$, the number of addresses being reduced to h, the latter value representing the denominator of the irreducible fraction $q/h = F_L/F_E$, and the addresses having the h values 0, $2\pi q/h$, $2(2\pi q/h)$ ..., $(h-1)(2\pi q/h)$, and of which each row contains at the intersection points with the columns the digital value of cos $\phi$ or sin $\phi$;
- means for receiving the multifrequency signal samples at the frequency $F_E$, in successive groups of h; and
- a multiplier which generates the product of the digital value of each sample and either cos $\phi$ or sin $\phi$, where $\phi$ is the address corresponding to the order of the sample within each group of h.

6. A digital receiver in accordance with claim 5, wherein said low-pass digital filtering means comprises first and second identical digital filters operating at the frequency $F_E$, said first and second filters being connected to the outputs of said first and second computing elements, respectively, each of said filters being a recursive filter having an attenuation less than a predetermined value, $A_{max}$, in the pass-band from $nF_E - f_p$ to $nF_E + f_p$ ($n = 0, 1, 2, 3 \ldots \infty$), said attenuation being greater than said predetermined value, $A_{min}$, in the part of the spectrum beyond the frequency $F_L + f_{min}$, $f_{min}$ being equal to the lowest frequency in the spectrum of the q frequencies.

7. A digital receiver in accordance with claim 6, wherein the attenuation $A_{max}$ of said digital filters is negligible, each of said filters is connected to the input of said means counting up to r, each of said counting means is connected to the input of said fast fourier transform calculation means, said calculation means including $N_T$ input pairs and v output pairs of known orders, each pair corresponding to one and only one of the frequencies f, said calculation means producing, in digital form, the complex components $A_f \exp(j\phi_f)$ of the spectrum, each output pair being followed by a digital multiplier generating $A^2_f \cos^2\phi_f$ for one output and $A^2_f \sin^2\phi_f$ for the other, and said receiver further comprises q digital adders each receiving the digital values of the same order and each producing on its output the digital value $A^2_f$ corresponding to this order.

8. A digital receiver in accordance with claim 6, wherein the attenuation $A_{max}$ of said digital filters is not negligible, each of said filters being connected to the input of said means counting up to r, each of said counting means being connected to the input of said fast fourier transform calculation means, said calculation means including $N_T$ input pairs and V output pairs of known orders, each pair corresponding to one and only one of the frequencies f, said calculation means producing, in digital form the complex components $A_f \exp(j\phi_f)$ of the spectrum, each output pair being followed by a digital multiplier generating $A^2_f \cos^2\phi_f$ for one output and $A^2_f \sin^2\phi_f$ for the other, and said receiver further comprises q digital adders each receiving the digital values of the same order and each producing on its output the digital value $A_f^2$ corresponding to this order, the effect of the attenuations in the pass-band affecting each value of $A^2_f$ associated with a frequency f being corrected by a plurality, but not more than q, multipliers connected to the outputs of said q digital adders, for multiplying the outputs by the coefficients by $a_1, a_2 \ldots a_q$, respectively.

9. A digital receiver in accordance with claim 8, wherein to compensate for receipt of a spurious signal of frequency $f_c$, whose transform $(F_L - f_c)$ by frequency shifting ($|F_L - f_c| < F_T/2$) lies in the transition zone of the digital filters, the receiver further comprises auxiliary means providing attenuation at this frequency $F_L - f_c$, said auxiliary means comprising third and fourth digital filters of the same nature as said first and second digital filters and having the same passband from $nF_E - f_p$ to $nF_E + f_p$, ($n = 0, 1, 2 \ldots \infty$) but operating at the frequency $F_T$, said coefficients $a_1, a_2 \ldots a_q$ being modified to allow for the additional attenuations due to said third and fourth digital filters within the pass-band.

10. A digital receiver in accordance with claim 8, in which $2F_T$ is a divisor of $F_E$ and wherein to compensate for receipt of a spurious signal of frequency $f_c$, whose transform $(F_L - f_c)$ by frequency shifting $(F_T > |F_L - f_c| > F_T/2)$ lies in the transition zone of said first and second filters, the receiver further comprises auxiliary means for providing attenuation at this frequency $F_L - f_c$, said auxiliary attenuation means comprising first and second counters each counting up to r/2, first and second auxiliary digital filters each having the same pass-band from $nF_E - f_p$ to $nF_E$, ($n = 0, 1, 2 \ldots \infty$) but operating at the frequency $2F_T$, and first and second counters counting up to 2, said coefficients $a_1, a_2 \ldots a_q$ being modified to allow for the additional attenuations due to the auxiliary digital filters within the pass-band.

* * * * *